(12) United States Patent
Choi et al.

(10) Patent No.: US 7,679,867 B2
(45) Date of Patent: Mar. 16, 2010

(54) MAGNETIC FLUX-COUPLING TYPE SUPERCONDUCTING FAULT CURRENT LIMITER

(75) Inventors: Hyo-Sang Choi, Gwangju (KR); Hyoung-Min Park, Gwangju (KR); Yong-Sun Cho, Gwangju (KR); Gueng-Hyun Nam, Gwangju (KR); Na-Young Lee, Gwangju (KR); Tae-Hee Han, Jeollabuk-do (KR); Sung-Hun Lim, Jeollabuk-do (KR); Dong-Chul Chung, Jeollabuk-do (KR)

(73) Assignee: Industry-Academic Cooperation Foundation, Chosun University, Gwangju (KR)

(*) Notice: Subject to any disclaimer, the term of this patent is extended or adjusted under 35 U.S.C. 154(b) by 230 days.

(21) Appl. No.: 11/693,761

(22) Filed: Mar. 30, 2007

(65) Prior Publication Data
US 2007/0257755 A1    Nov. 8, 2007

(30) Foreign Application Priority Data
May 4, 2006   (KR) .................... 10-2006-0040270

(51) Int. Cl.
*H01F 6/00* (2006.01)
*H02H 9/00* (2006.01)

(52) U.S. Cl. ........................................ 361/19; 335/216
(58) Field of Classification Search ................... 361/19; 335/216
See application file for complete search history.

(56) References Cited

U.S. PATENT DOCUMENTS 3,629,690 A * 12/1971 Massar .................... 361/19
5,892,644 A *  4/1999 Evans et al. ............... 361/19
7,345,858 B2 *  3/2008 Lee et al. .................. 361/19

* cited by examiner

*Primary Examiner*—Ramon M Barrera
(74) *Attorney, Agent, or Firm*—Bardmesser Law Group

(57) ABSTRACT

A magnetic flux coupling-type superconducting current limiter is capable of protecting lines more effectively by winding reactors of a primary coil and a secondary coil in series in the structure where the primary coil and the secondary coils are wound in parallel in the conventional magnetic flux-lock type current limiter to increase a linked flux generated from an iron core. An electric conducting current which rapidly increases when a fault occurs is divided into the secondary coil and a superconducting coil to decrease a load on the superconducting element and it is opened more rapidly than the existing superconducting current limiter during a quench time such that it better limits a fault current.

10 Claims, 18 Drawing Sheets

MAGNETIC FLUX-COUPLING TYPE SUPERCONDUCTING FAULT CURRENT LIMITER

CROSS-REFERENCE TO RELATED APPLICATIONS

The present application claims priority to Korean Patent Application No. 10-2006-0040270, filed May 4, 2006, which is incorporated herein by reference in its entirety.

BACKGROUND OF THE INVENTION

1. Field of the Invention

The present invention relates, generally, to magnetic flux-coupling type superconducting fault current limiters, more particularly, to an environment-friendly and semi-permanent magnetic flux-coupling type superconducting fault current limiter that has a primary coil winding and a secondary coil of the magnetic flux-coupling superconducting fault current limiter in series and superconducting element winding around the secondary coil in parallel so as to reduce a load on a element when a fault occurs, and to improve the handling and the time for recovering a fault current using linked flux as much as possible.

2. Description of the Related Art

As the superconducting fault current limiter uses a quench characteristic that an electric resistance does not exist at a normal state but becomes high immediately when a fault occurs, it can cut off a fault current rapidly without additional control devices and detecting devices, but also can be automatically recovered after the fault is removed. Various kinds of current limiters using a superconductor have been developed based on the above features.

The superconducting fault current limiter has been developed in consideration of an economic efficiency and reliability, so as to supply a high quality power to an electric power system. When a superconductor is used as a fault current limiting device, there is no need to replace it upon reintroduction of current into an electric power system and the increase of a required power via rapidly limiting and recovering the fault current. The resistive type current limiters that limit a fault current by switching operations out of these characteristics are classified into a shunt type, a transformer type and a magnetic flux-lock type. The magnetic flux-lock type current limiter, with a YBCO thin film as a fault current limiting element, can be easily diffused by modules is wound to a magnetic flux reactor has an effective structure owing to the increase of electric conducting currents and an active operation in accordance with the establishment conditions. Since a new superconducting current limiter that applies the principle of a magnetic flux type uses a ferromagnetic iron core as a magnetic flux medium, such as conventional magnetic flux-lock type superconducting fault current limiter, it is important to analyze characteristics of operations due to an inductance ratio in accordance with the primary winding and the secondary winding, define the conditions for designing the limiter.

These current limiters belong to a resistive type, which has a simple structure but can reduce a fault current rapidly when a fault occurs, and can be miniaturized easily. However, this limiter is very susceptible to damage of a current limiting element, because it is directly conductive. The shield inductive type is less susceptible to damage, because a fault current does not directly flow through it, but is not in an electric power system due to its large volume, for current manufacturing technology, which uses an iron core, and also due to the power loss of the iron core because it is manufactured in the shape of a tube or ring. Furthermore, a bridge type is designed to limit a fault current by the inductance of a superconducting coil using a diode for power, and does not create a quench of a superconducting element to maintain the limiting capability given repeated operations. It also has problems, such as the loss of a power element, the costs for manufacturing a superconducting coil and the increase of the volume of the limiter.

The magnetic flux-lock type as a quench type limiter has an electric resistance of 0, which is a feature of a superconductor, is similar to the resistive type limiter in that a fault current directly flows to a superconductor to generate a quench due to exceeding a critical current value, and then to limit a fault current. It also has features capable of overcoming the problems of the existing resistive type and the shield inductive type. The above-identified conventional magnetic flux-lock type superconducting fault current limiter is used as a part of main power lines between a power supplying terminal and a power receiving terminal and functions as a fault current limiting element when a fault is generated.

FIG. 1 is an equivalent circuit diagram of the conventional magnetic flux-lock type superconducting fault current limiter. The conventional magnetic flux-lock type superconducting fault current limiter, as shown in FIG. 1, has wires connected in parallel by winding the coil 1 ($L_3$) and the coil 2 ($L_4$) around the ferromagnetic iron core by $N_3$ and $N_4$ turns, respectively and to connect the superconducting element ($R_{SC}$) with the coil 2 ($L_4$) in series. At this time, the superconducting element ($R_{SC}$) is inside a cooling bath containing liquid nitrogen, considering its critical temperature.

The operational characteristics of the magnetic flux-lock type superconducting fault current limiter are divided into an additive polarity winding, and a subtractive polarity winding, depending on the directions of winding the coil 1 ($L_3$) and the coil 2 ($L_4$), which are connected in parallel. If the voltages induced in the coil 1 ($L_3$) and the coil 2 ($L_4$) are represented as $V_3$ and $V_4$, respectively, the voltages of both coils are shown in Equations 1 and 2 as follows, $$V_3 = N_3 \frac{d\phi_3}{dt} \quad \text{Equation 1}$$

$$V_4 = \pm N_4 \frac{d\phi_4}{dt} \quad \text{Equation 2}$$

The above magnetic flux-lock type superconducting current limiter has a voltage of '0' at both terminals of the superconducting element (Rsc) at a normal state and therefore, the voltages at both terminals of the coil 1 ($L_3$) and the coil 2 ($L_4$) are represented as follows:

$$(N_3 \mp N_4) \cdot \frac{d\phi}{dt} = 0 \quad \text{Equation 3}$$

In Equation 3, if $N_3 \mp N_4 \neq 0$, then $$\frac{d\phi}{dt} = 0.$$

The voltages at both coils are not generated at a normal state to be maintained at 0V. However, if a fault occurs to cause a fault current in excess of the critical current to the superconducting element ($R_{SC}$), the superconducting element ($R_{SC}$) is quenched to dramatically increase the superconducting element resistance, which causes the linked flux of the coil 1 ($L_3$) and the coil 2 ($L_4$) to generate the voltages at both terminals of the coils and the fault current is rapidly limited.

However, the primary and secondary coils are connected in parallel with the superconducting element in a conventional magnetic flux-lock type superconducting current limiter. If a fault occurs, the voltage at both terminals of a superconducting element increases at the additive polarity winding, which gives a load to the superconducting element. Furthermore, if the superconducting element ($R_{SC}$) has resistance of 0Ω at an additive polarity winding and the inductance ratio between the primary coil and the secondary coil is set to 1, a current where the superconducting current ($I_{SC}$) flowing in the superconducting element is relatively much greater than the magnitude of the line current ($I_{FCL}$) can circulate, and there is a problem that the turns ratio of the second coil to the primary coil cannot be set to be greater than 1.

SUMMARY OF THE INVENTION

Accordingly, the present invention has been made keeping in mind the above problems, and one object of the present invention is to increase a linked flux generated from an iron core after a fault occurs by winding the reactors of the primary coil and the secondary coil in series in the structure, compared to the primary coil and the secondary coil being wound in parallel in the conventional magnetic flux-lock type current limiter.

The operational characteristics of the magnetic flux-coupling type superconducting fault current limiter are divided into an additive polarity winding, and a subtractive polarity winding depending on the directions between the primary and secondary coils. The inductance ratio between two the coils controls the value of the initial line current after a fault occurs.

According to the magnetic flux-coupling type superconducting fault current limiter of the present invention, when a fault occurs, the entire voltage is divided by the primary coil and the secondary coil to reduce the load on the superconducting element, and the limiter operates more rapidly than the conventional magnetic superconducting flux-lock type fault current limiter during a quench time, which is beneficial in limiting the fault current.

If the magnetic flux-lock type superconducting fault current limiter is wound into an additive polarity winding and the inductance ratio between the primary coil and the secondary coil is set to 1, this places a great load on the power system. However, the magnetic superconducting flux-coupling type described herein is safer than the conventional additive polarity winding, due to its operational characteristics and its structural principles.

It is useful in view of protecting a superconducting element, because a line current and an element voltage are decreased at a subtractive polarity winding of the magnetic flux-coupling type fault current limiter, as compared with subtractive polarity winding of the conventional magnetic flux-lock type fault current limiter, therefore the element has less load. In addition, it is another object of the present invention to provide with a magnetic flux-coupling type current limiter capable of improving utility and operation of a fault current limiter, because the quench time is relatively shorter than at the subtractive polarity winding of the conventional magnetic flux-lock type.

In order to attain the above objects, a magnetic flux-coupling type superconducting fault current limiter according to the present invention comprises: a superconducting element whose primary coil and a secondary coil are wound around a magnetic iron core, respectively in series and connected with the secondary coil in parallel.

It is preferable that the superconducting element according to the present invention be immersed in a bath containing liquid nitrogen. It is preferable that the primary coil and the secondary coil be wound around the ferromagnetic iron core in a laminated structure. It is preferable that at least one tap be put in between the primary coil and the secondary coil to change the number of turns. It is preferable that the magnetic iron core, use a ferromagnetic iron core and the primary coil and the secondary coil are wound in an additive polarity and a subtractive polarity, respectively.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Figure 1:
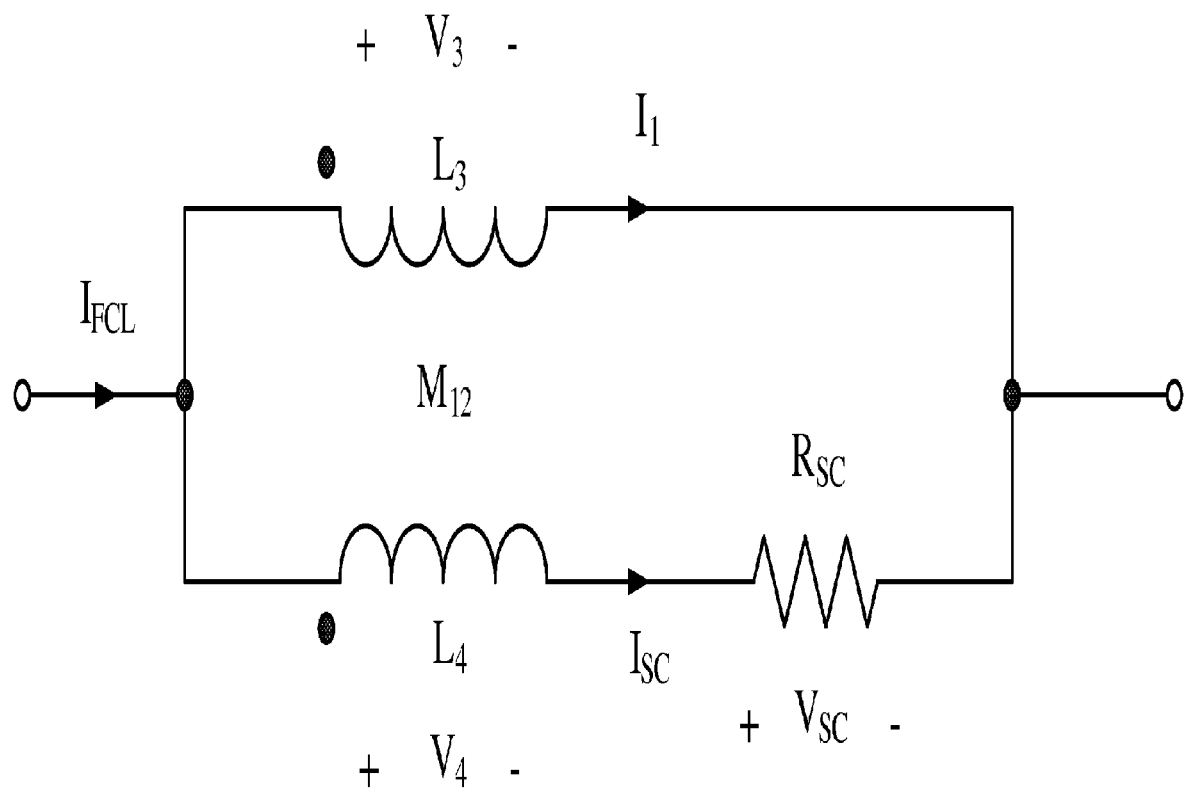
FIG. 1 is an equivalent circuit diagram of the conventional magnetic flux-lock type fault current limiter.

Reference will now be made in detail to the preferred embodiments of the present invention, examples of which are illustrated in the accompanying drawings.

Reference now should be made to the drawings, in which the same reference numerals are used throughout the different drawings to designate the same or similar components in the following description of the present invention, detailed descriptions may be omitted if it is determined that the detailed descriptions of related well-known functions and constructions may make the gist of the invention unclear.

Figure 2A:
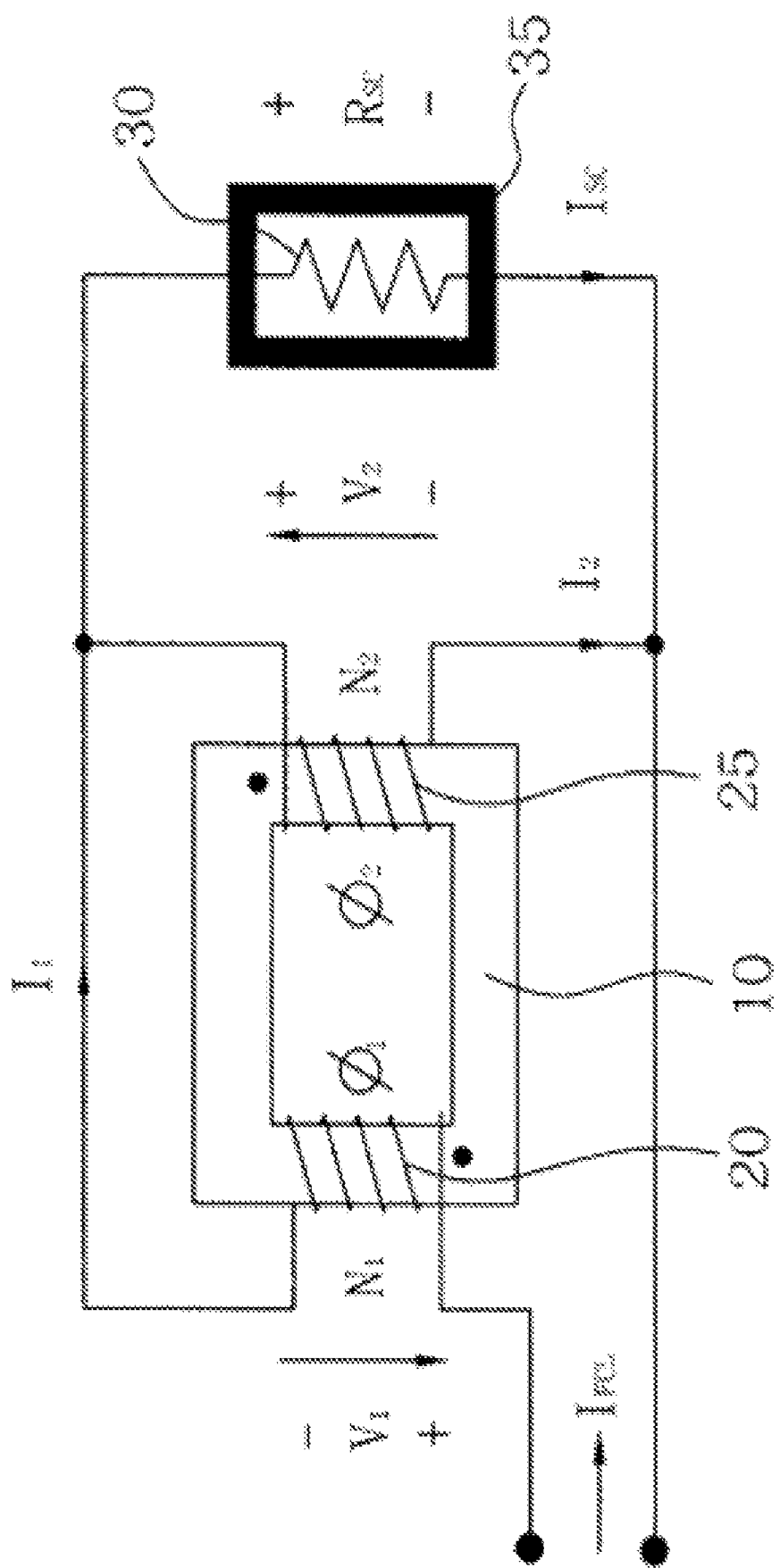
FIG. 2A is an equivalent circuit diagram of a magnetic flux-coupling type fault current limiter in accordance with one embodiment of the present invention.
Figure 2B:
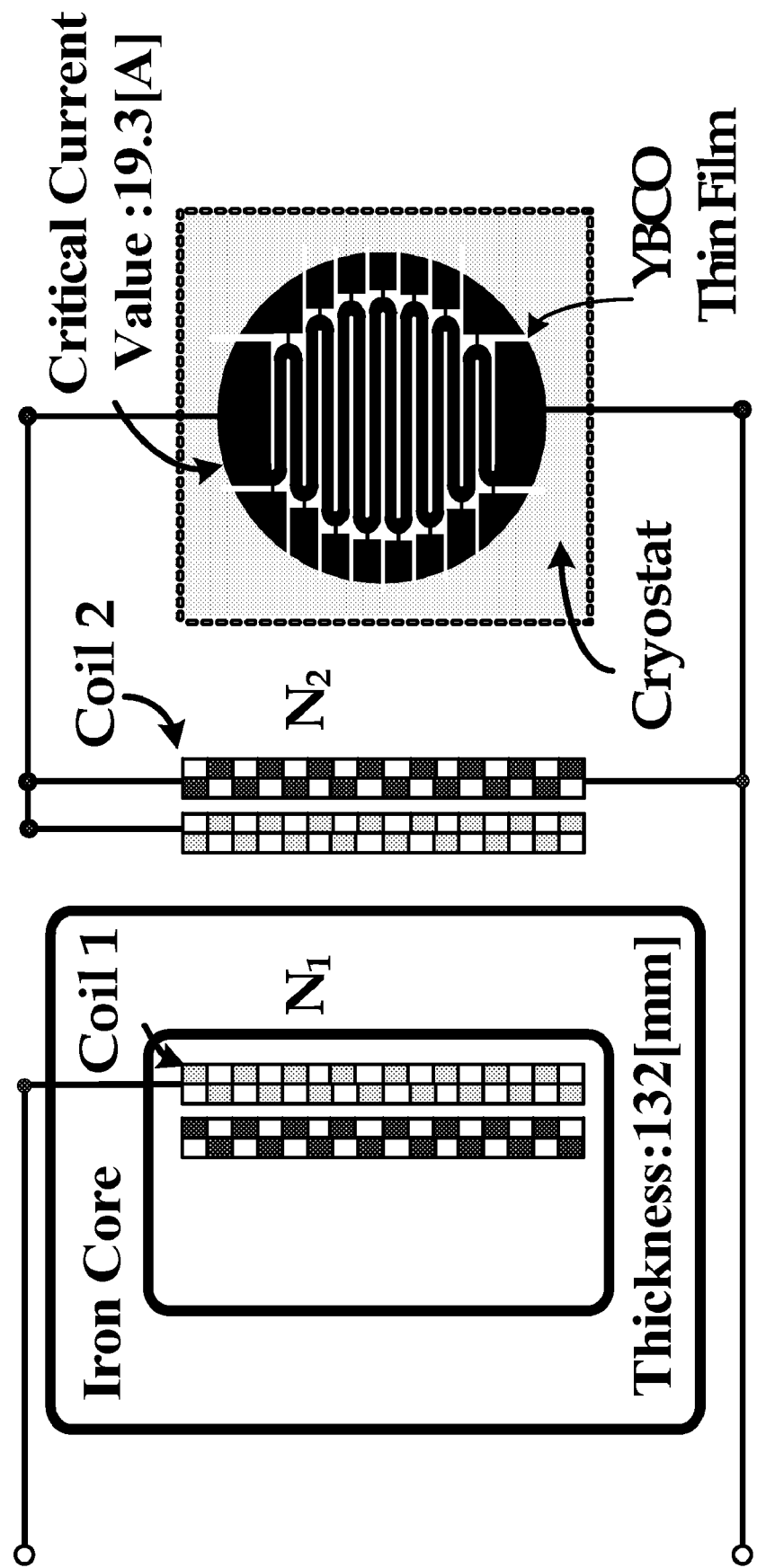
FIG. 2B is a circuit configuration diagram for testing it.
Figure 2C:
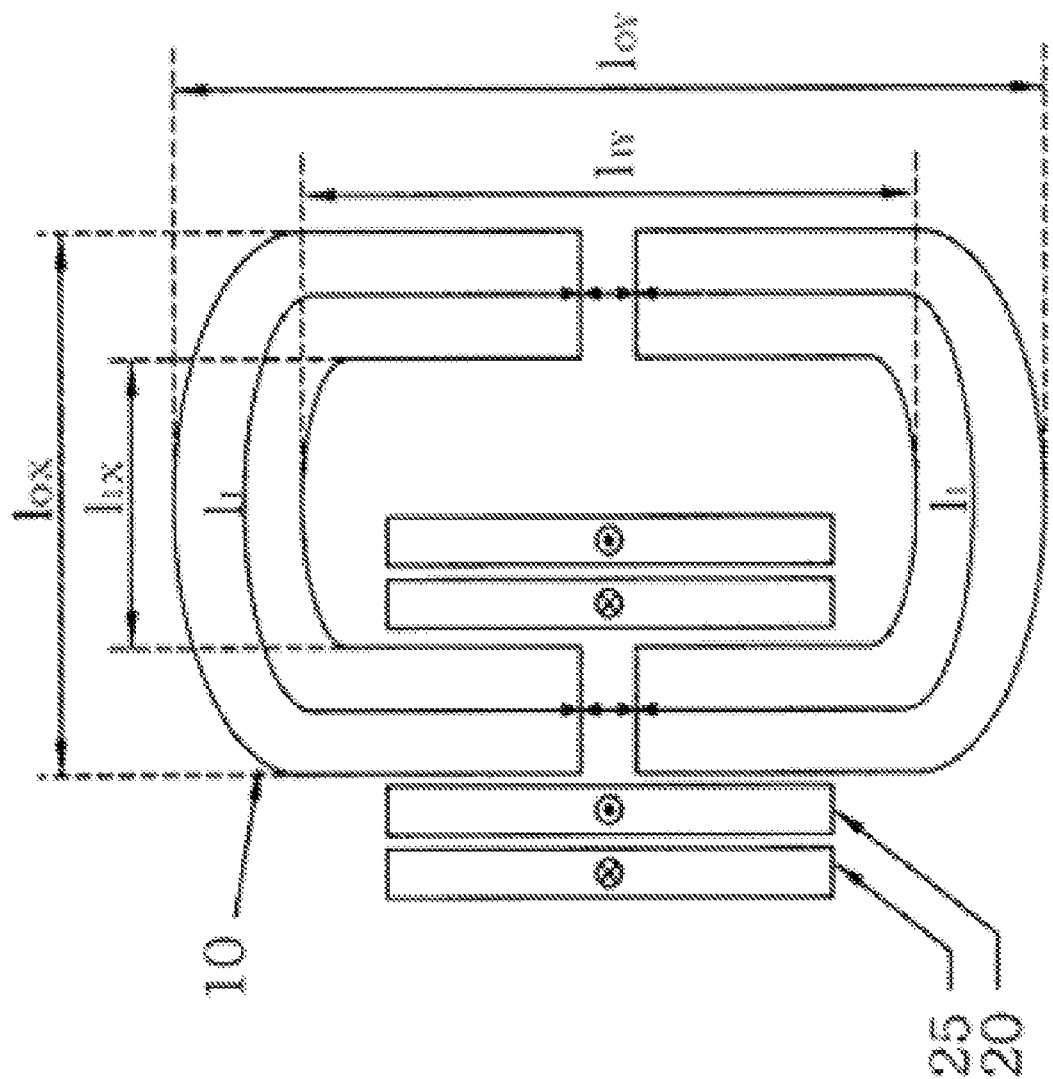
FIG. 2C is a cross-sectional view of a magnetic flux coupling type reactor.

FIG. 2A is an equivalent circuit diagram of a magnetic flux-coupling type fault current limiter in accordance with one embodiment of the present invention, FIG. 2B is a circuit configuration for testing it and FIG. 2C is a cross-sectional view of a reactor.

In one embodiment of the invention, the magnetic flux-coupling type superconducting fault current limiter includes: a magnetic iron core (10), a primary coil (20), a secondary coil (25) and a superconducting element (30), as shown in FIG. 2A. The secondary coil (25) is wound around the primary coil (20), forming a laminated structure.

In this embodiment, the method for winding between the primary coil and the secondary coil at the magnetic iron core and the position where the superconducting element is coupled is shown schematically.

Referring to FIG. 2A, the primary coil (20) and the secondary coil (25) are wound around the magnetic iron core (10) by N1 and N2 turns, respectively to be directly connected to a power line and the superconducting element (30) is connected to the secondary coil (25) in parallel.

It is preferable that the superconducting element (30) is made of YBCO thin film (or the like) be coupled to the secondary coil (25) in parallel and be immersed in a bath of a low temperature. In the present invention, as shown in FIG. 2B, the superconducting element (30) is provided in a bath (35) of a low temperature containing a liquid nitrogen in order to maintain a superconducting state for a long time, by preventing the liquid nitrogen from being evaporated.

It is preferable that the magnetic iron core (10) use a ferromagnetic iron core in general and the primary coil (20) and the secondary coil (25), as shown in FIG. 2C, have the structure of a magnetic flux-coupling reactor.

Referring to FIG. 2C, the primary coil (20) and the secondary coil (25) are wound in a stacked structure in order to be offset by maximizing the connection between magnetic flux generated from the primary coil (20) and the secondary coil (25) at a normal state. In the meantime, it is preferable that the secondary coil (25) have several taps between its ends so that the turns of the secondary coil (25) are changed.

The ferromagnetic iron core may be manufactured in various shapes, as is known in the art, but a ferromagnetic iron core shown in the Table 1 below was used in one embodiment of the present invention.

TABLE 1

| Iron Core (Silicon Plate) | Size | Units |
|---|---|---|
| External horizontal length ($l_{OX}$) | 235 | mm |
| External vertical length ($l_{OY}$) | 250 | mm |
| Internal horizontal length ($l_{IX}$) | 137 | mm |
| Internal vertical length ($l_{IY}$) | 155 | mm |
| thickness (d) | 66 | mm |

TABLE 1-continued

| Coil 1, 2 | Value | Units |
|---|---|---|
| Magnetic Inductance of Coil 1 | 18.1 (42) | mH |
| (number of turns) | 48.4 (63) | (Turns) |
| Magnetic Inductance of Coil 2 | 2.93 (21) | mH |
| (number of turns) | 18.1 (42) | (Turns) |
| Magnetic Inductance of Coil 1 | 48.4 (63) | mH |
| (number of turns) | 93.8 (84) | (Turns) |
| (number of turns) | 151.6 (105) | (Turns) |

Figure 3:
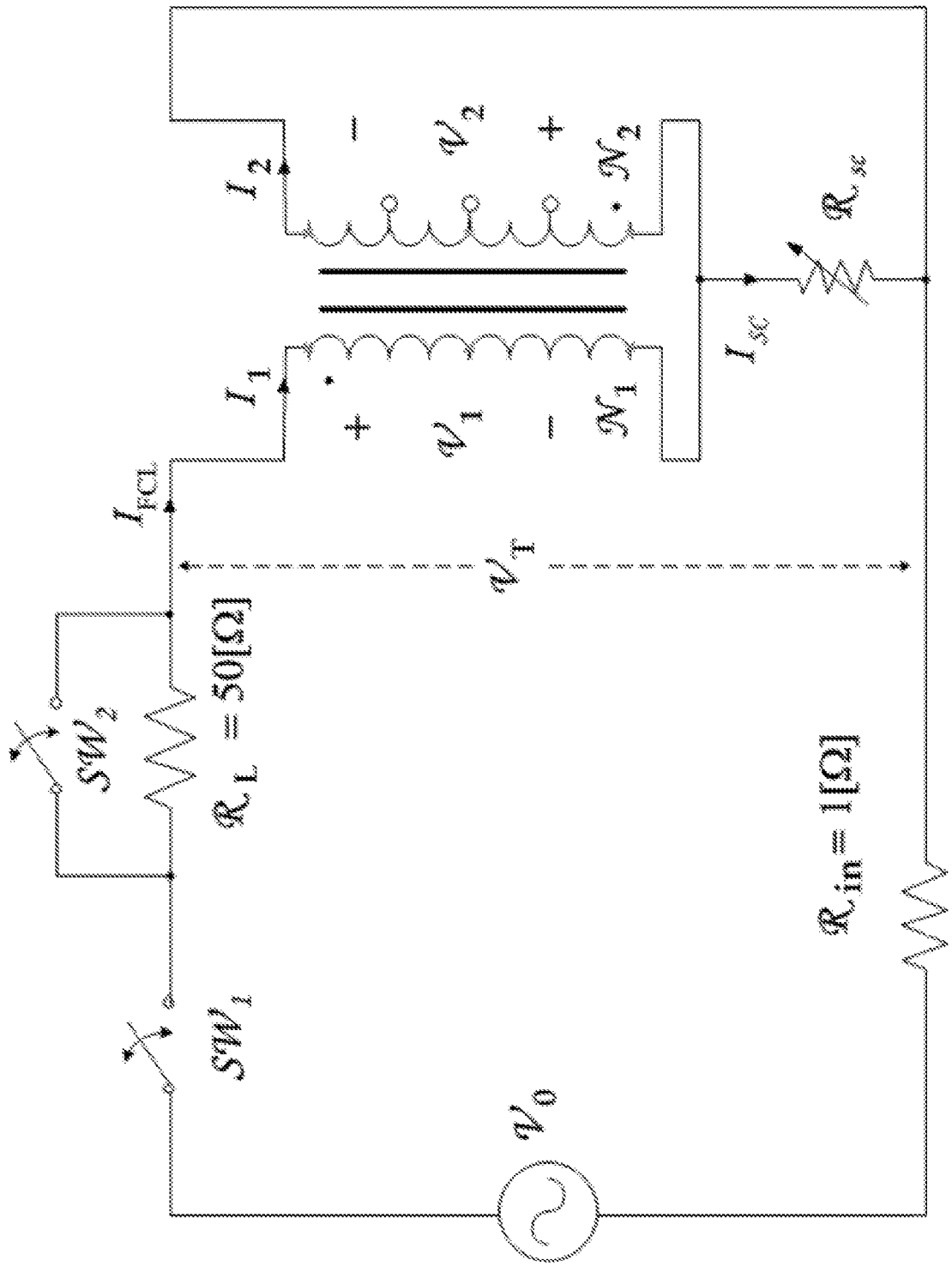
FIG. 3 is a circuit diagram for analyzing quench characteristics of a magnetic flux-coupling type superconducting fault current limiter in accordance with one embodiment of the present invention.

FIG. 3 is a circuit diagram for analyzing the quench characteristics of a magnetic flux-coupling type superconducting current limiter according to one embodiment of the present invention.

In this embodiment, the circuit diagram for analyzing the quench characteristics of a fault current limiter for improving quenches includes: a magnetic flux-coupling type superconducting fault current limiter, a first fault switch ($SW_1$), a second fault switch ($SW_2$), a load resistance ($R_L$) and a power source of the system ($V_0$).

In the embodiment, an apparatus for analyzing the characteristics of the change of a current in accordance with the operations of a fault switch is schematically shown.

Referring to FIGS. 2A and 3, a magnetic flux-coupling type superconducting fault current limiter is shown in a structural condition that a line current is $I_{FCL}$, a primary current is $I_1$, a secondary current $I_2$ and a current flowing into a element is $I_{SC}$.

In addition, the rated voltage ($V_0$) of a system is $120/\sqrt{3}V_{rms}$ and a standard input resistance ($R_{in}$) are set to $1\Omega$ in order to measure the current flowing in a circuit and a load resistance ($R_L$) is $50\Omega$. Furthermore, a power switch ($SW_1$) for applying a power voltage and a fault switch ($SW_2$) for raising a fault are provided. After the power switch ($SW_1$) is closed, an excessive current for simulation of a fault is generated using the fault switch ($SW_2$).

Referring to FIGS. 2A and 3, the system can be analyzed as follows. A primary winding and a secondary winding are wound around an iron core with the same polarity. However, since the resistance of the superconducting element at the secondary winding is 0 before a fault occurs, there is no change of magnetic flux not to operate the reactors. Therefore, it can be seen that the voltages at both terminals of a coil is close to 0 before a fault. If the voltages induced to the coil 1 and the coil 2 are $V_1$ and $V_2$, respectively:

$$V_1 = N_1 \frac{d\phi_1}{dt} \qquad \text{Equation 4}$$

$$V_2 = N_2 \frac{d\phi_2}{dt} \qquad \text{Equation 5}$$

Therefore, the voltage $V_T$ applied to the reactor is as follows, $$V_T = (N_1 + N_2) \cdot \frac{d\phi}{dt} \qquad \text{Equation 6}$$

The operation of a superconducting fault current limiter can be classified into operations in a normal state and in the state of a fault. Since the voltages at both terminals of a superconducting element in its normal state are 0, there are no voltages generating from a reactor of each coil. The principle is similar to that of the magnetic flux-lock type. If a fault occurs, and a fault current in excess of a critical current flows in a superconducting element the secondary superconducting element, has a resistance to operate an iron core. The entire fault current is limited rapidly due to the phase transition of a superconducting element.

In FIG. 3, $L_1$ and $L_2$ are self-inductances between two coils. $M_{12}$ is a mutual inductance induced between coils. ($M_{12}$=k$\sqrt{L_1 \cdot L_2}$) The resistance of a coil can be ignored if there is no leakage magnetic flux between the coils. The secondary current is $I_2$, the current flowing into a superconducting element ($R_{sc}$) is Isc and the entire line current is $I_{FCL}$ (=$I_1$). It is possible to derive the following equations from FIG. 3 at an additive polarity winding:

$$V_1 = j\omega L_1 \cdot I_1 + j\omega M_{12} \cdot I_2 \quad \text{Equation 7}$$

$$V_2 = j\omega M_{12} \cdot I_1 + j\omega L_2 \cdot I_2 = R_{SC} \cdot I_{SC} \quad \text{Equation 8}$$

The current relationship equations of a magnetic flux-coupling fault current limiter can be derived from the Equation 8:

$$I_{SC} = \frac{j\omega L_2 + j\omega M_{12}}{R_{SC} + j\omega L_2} \cdot I_1 \quad \text{Equation 9}$$

$$Z_{FCL} = \frac{j\omega R_{sc}(L_1 + L_2) + j2\omega R_{sc}M_{12}}{R_{sc} + j\omega L_2} \quad \text{Equation 10}$$

When the current flowing in a superconducting element reaches a critical current value ($I_q$) immediately after a fault occurs in a magnetic flux-coupling type superconducting fault current limiter in the Equation 9, if the initial limiting current is defined as $I_{ini}$, and $R_{SC}$=0 and Isc=$I_q$ (the current of the quench-starting point is substituted), the following equation can be derived. Here, it is assumed that the coupling coefficient k=1 in the inductance, $M_{12}$=k$\sqrt{L_1 \cdot L_2}$ $$\left| 1 \pm \sqrt{\frac{L_1}{L_2}} \right| = \frac{I_q}{I_{ini}} \quad \text{Equation 11}$$

L=$\sqrt{L_1} \pm \sqrt{L_2}$, and the + or − sign is determined depending on the increase or the decrease of a magnetic flux due to the primary and the secondary coils. The operational principle of such magnetic flux-coupling type superconducting fault current limiter shows differences in generating flux of an iron core when a fault occurs in accordance with a direction of winding coils, but it is determined that the inductance value is controlled by a winding ratio of a coil to control the magnitude of an initial line current ($I_{ini}$) through Equation 11.

The current flowing through the coils 1 and 2 has a phase difference of 180° by the operation of a transformer at an additive polarity winding of a magnetic flux-coupling type current limiter and the relationships between the voltage and the current shown in the equations 12 and 13 can be obtained when a fault occurs. Moreover, there is no effect in the direction of the secondary current in accordance with a winding direction and $I_2$ has a substantially negative sign, in other words, $I_2$=−$I_2'$. Therefore, the equations below can be derived.

$$I_{FCL}(I_1) = -I_2' + I_{sc} \quad \text{Equation 12}$$

$$V_T = V_1 + V_2(=V_{sc}) \quad \text{Equation 13}$$

The current generates the phase difference of 180° at a subtractive polarity winding of a magnetic flux-coupling type superconducting limiter. In addition, the current greater than the critical current value flows into a superconducting element simultaneously when a fault occurs, and the increase of a resistance of a superconducting element reduces line current. Therefore, the relationship between voltage and current can be obtained from Equations 14 and 15.

$$I_{FCL}(I_1) = I_2 + I_{SC}' \quad \text{Equation 14}$$

$$V_T = V_1 - V_2(=V_{sc}) \quad \text{Equation 15}$$

As described above, the operational principle can be analyzed based on the driving characteristics, in accordance with an additive polarity winding and a subtractive polarity winding, which shows whether or not a magnetic flux is increased. The relationship formula between electric conducting current Isc flowing to the superconducting element and the entire current in accordance with the winding ratios in the primary and the secondary coils is shown in Equation 16, and the entire voltage is shown in Equation 17.

$$\pm I_{SC} = \left[ \frac{N_1}{N_2} + 1 \right] \cdot I_1 \quad \text{Equation 16}$$

$$V_T = \left[ 1 \pm \frac{N_1}{N_2} \right] \cdot V_1 \quad \text{Equation 17}$$

Figure 4:
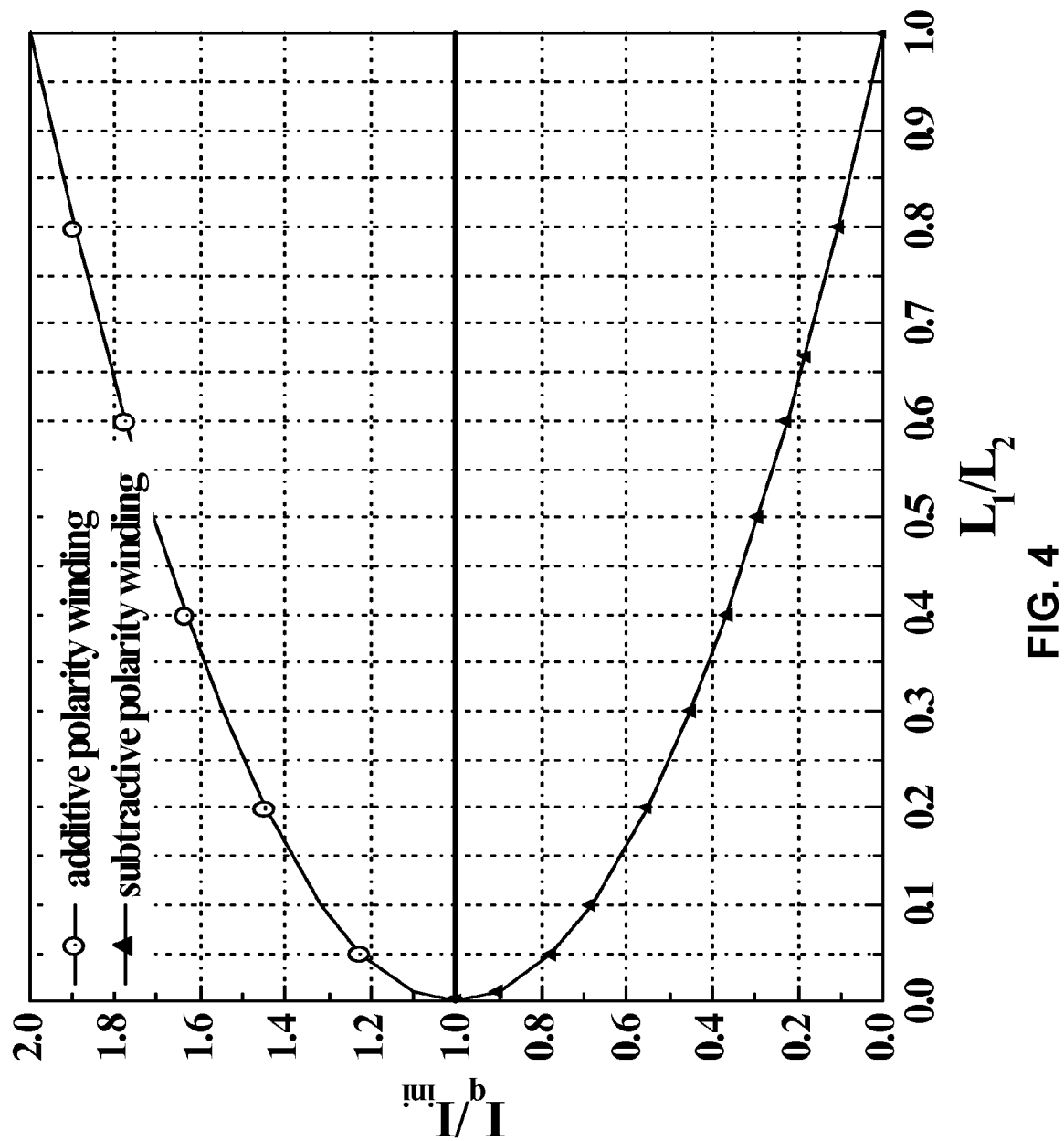
FIG. 4 shows a ratio of $I_q/I_{ini}$ to $L_1/L_2$ of the quench characteristics of a magnetic flux-coupling type fault current limiter in accordance with one embodiment of the present invention.

Equation 11 shows the relationship with respect to $I_q/I_{ini}$ and $L_1/L_2$, which are the initial fault current and critical current ratios of the superconducting element, respectively, in accordance with an inductance ratio of the coils 1 and 2, as shown in FIG. 4. These differences occur depending on whether a linked magnetic flux generated from an iron core is increased or decreased in a direction of winding of the primary and the secondary coils of a magnetic flux-coupling type superconducting fault current limiter when a fault occurs.

The operational features of the ferromagnetic substance in accordance with the change of turns of the primary coil and the secondary coil using the above configuration are as follows.

Figure 5A:
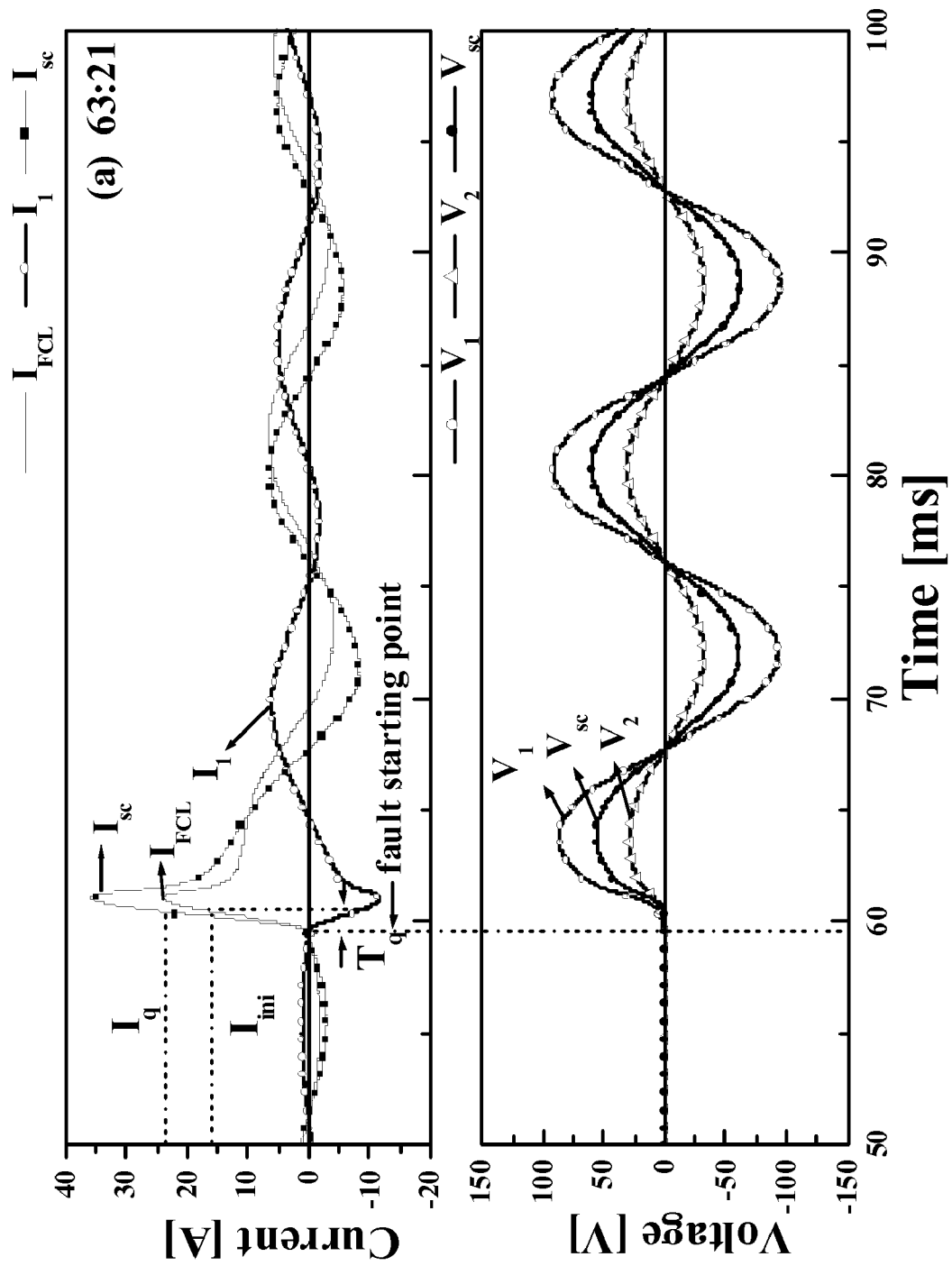
FIGS. 5A and 5B show waveforms of a voltage and a current at an additive polarity winding in the conventional magnetic flux-lock type fault current limiter.
Figure 5B:
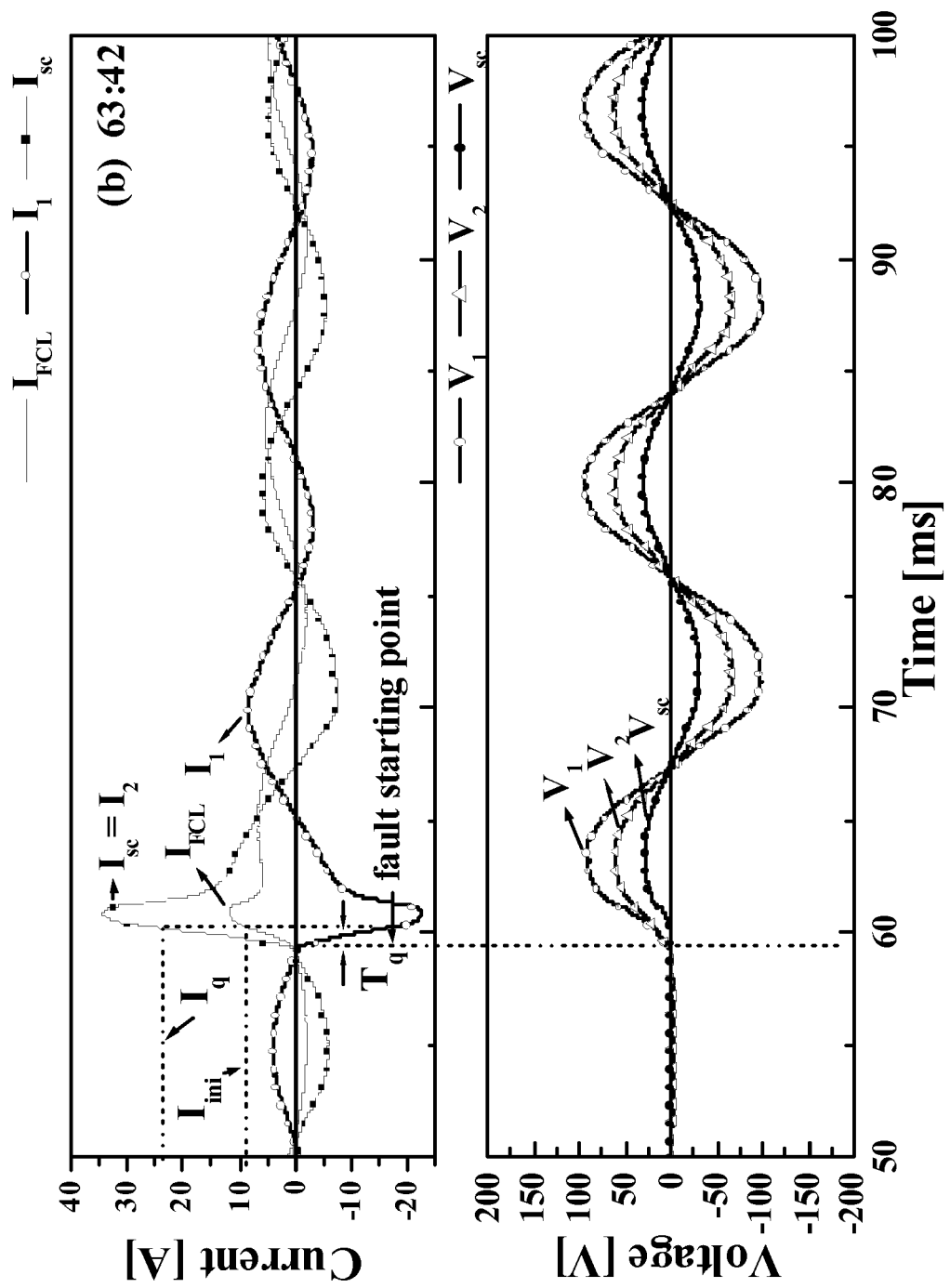
Figure 6A:
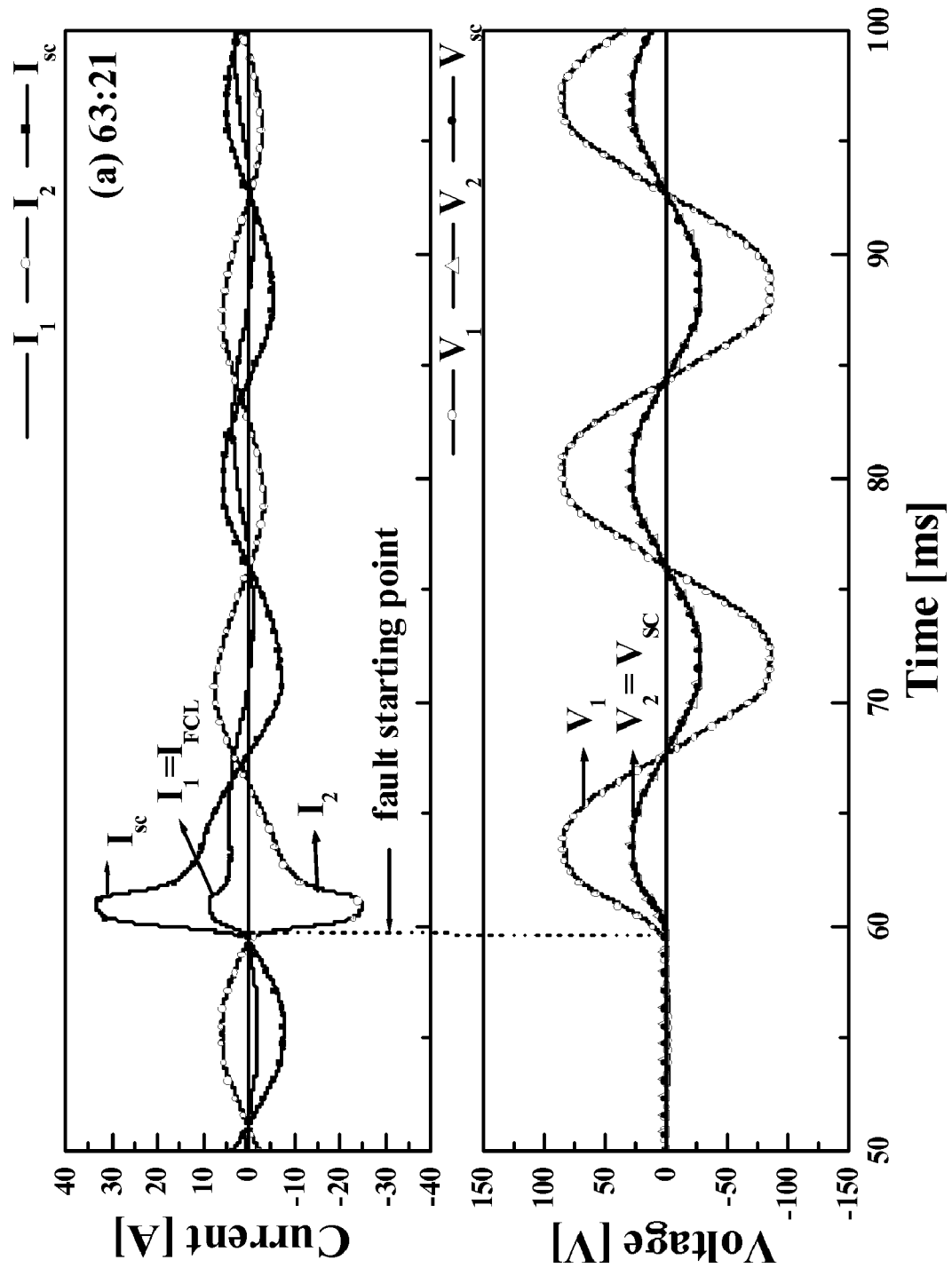
FIGS. 6A and 6B show waveforms of a voltage and a current at an additive polarity winding of a magnetic flux-coupling type superconducting fault current limiter in accordance with one embodiment of the present invention.
Figure 6B:
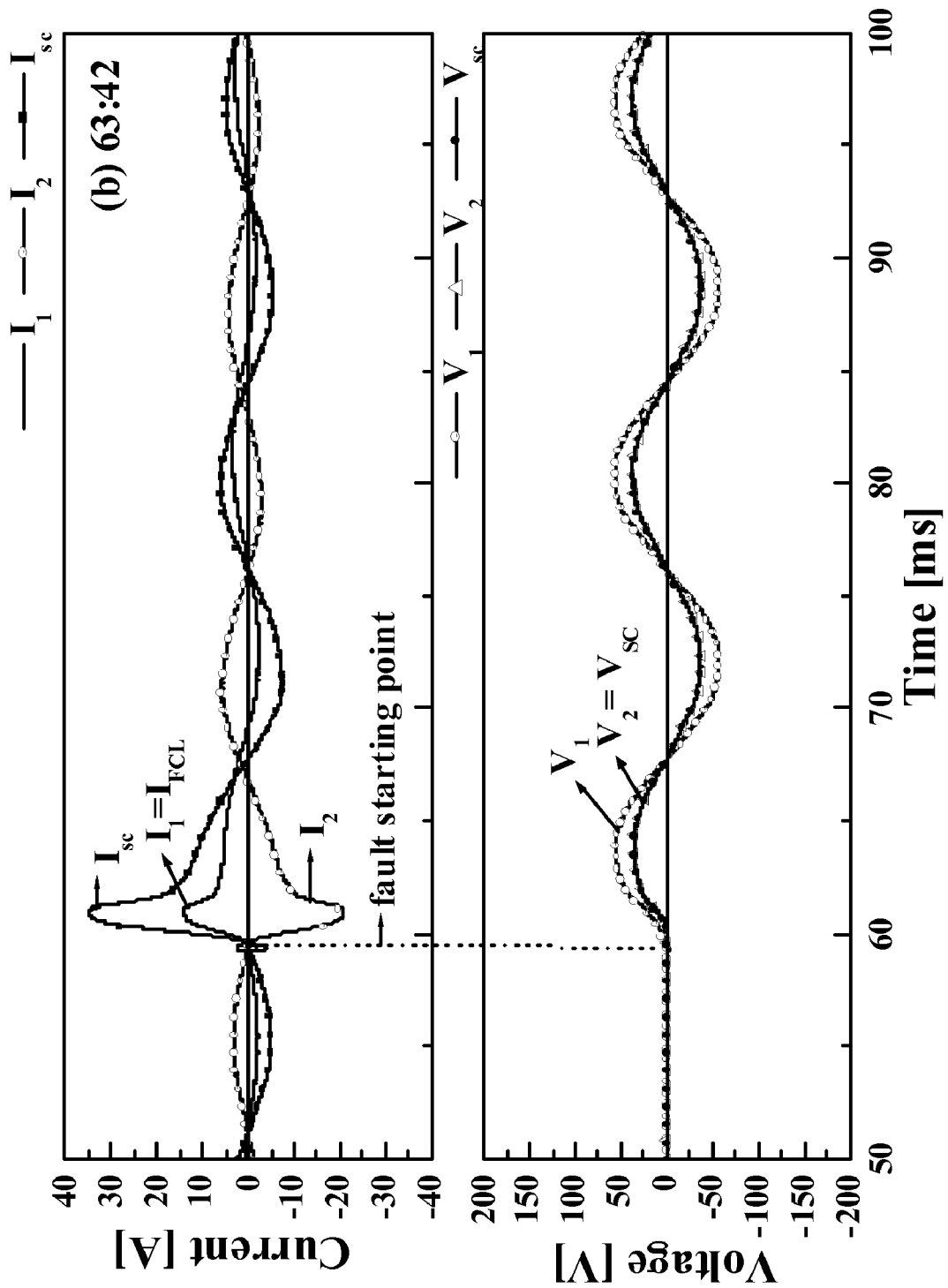

FIGS. 5A and 5B show waveforms of a voltage and a current at an additive polarity winding in the conventional magnetic flux-lock type fault current limiter. FIGS. 6A and 6B show waveforms of a voltage and a current at an additive polarity winding of a magnetic flux-coupling type superconducting fault current limiter in accordance with one embodiment of the present invention.

Figure 7A:
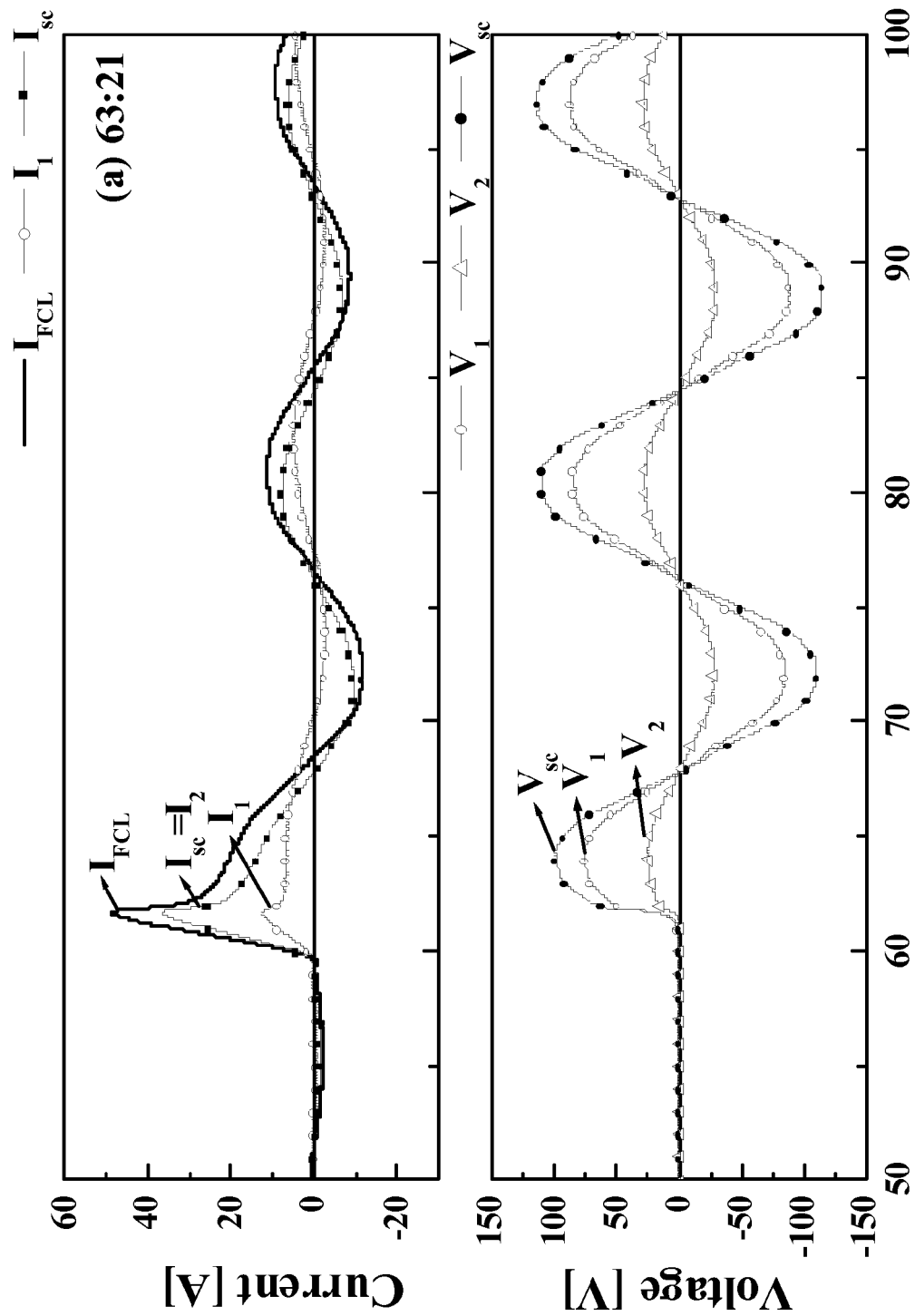
FIGS. 7A and 7B show waveforms of a voltage and a current at a subtractive polarity winding of the conventional magnetic flux-lock type fault current limiter.
Figure 7B:
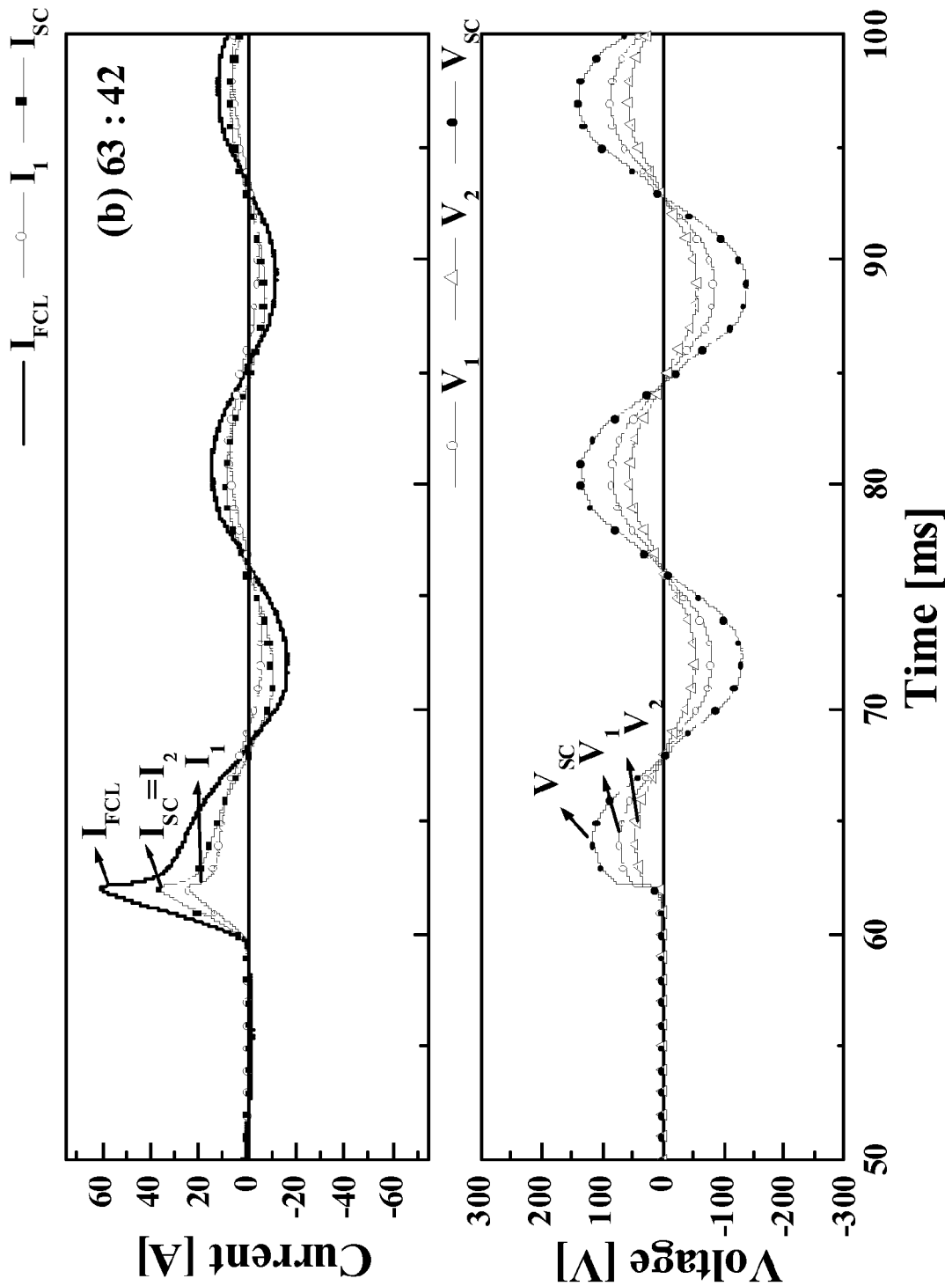

FIGS. 7A and 7B show waveforms of a voltage and a current at a subtractive polarity winding of the conventional magnetic flux-lock type fault current limiter.

Figure 8A:
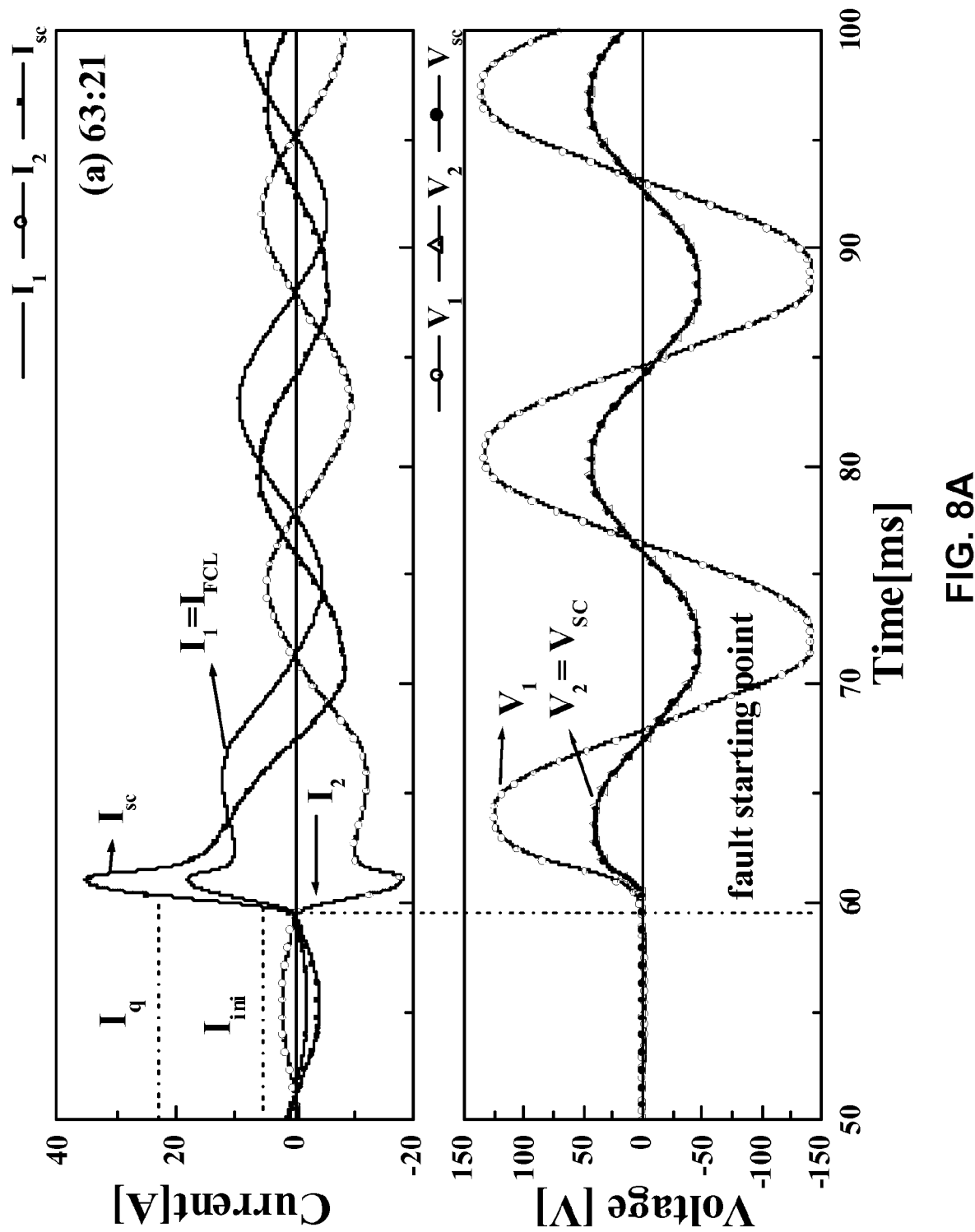
FIGS. 8A and 8B are waveforms of a voltage and a current at a subtractive polarity winding of a current limiter in accordance with one embodiment of the present invention.
Figure 8B:
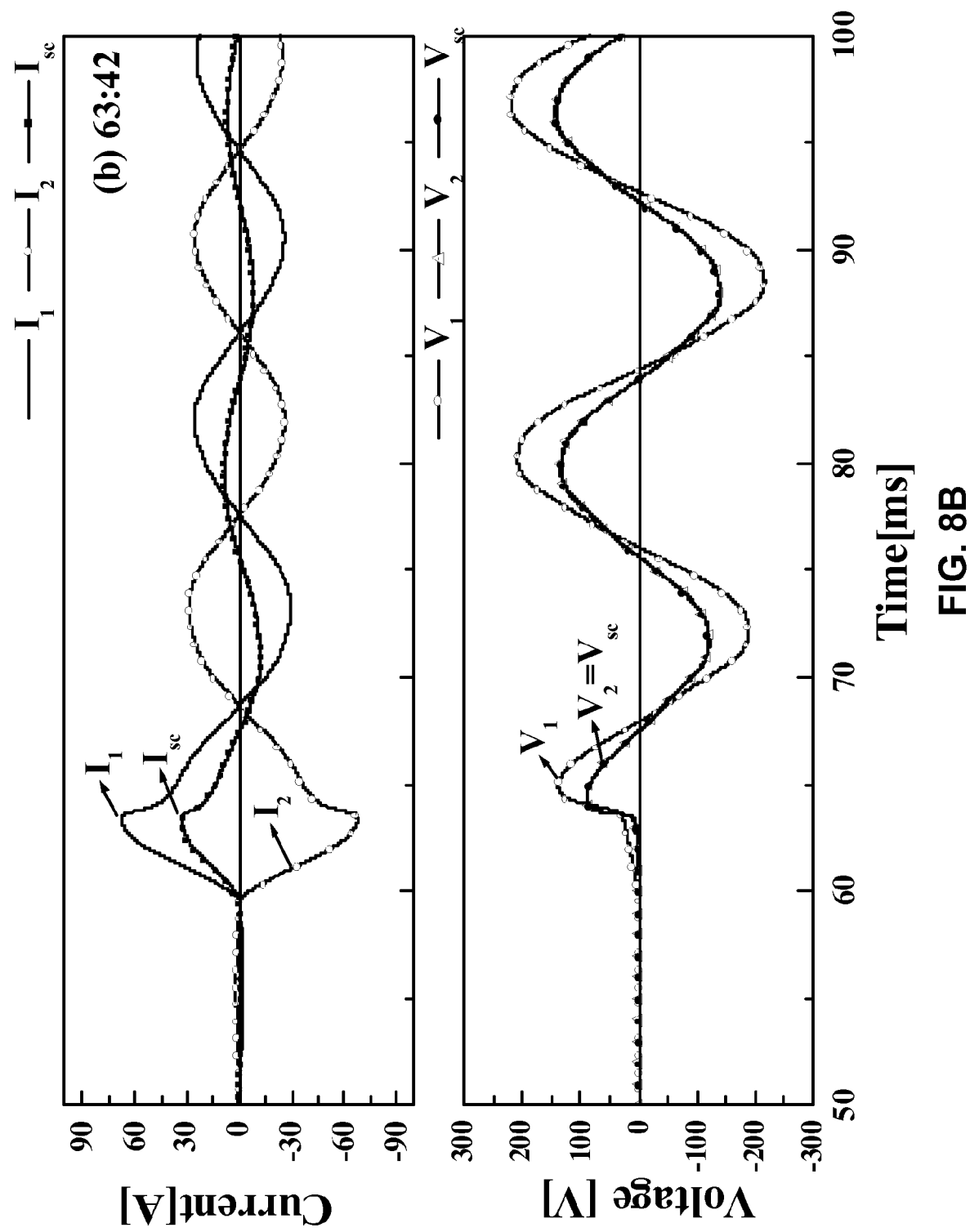

FIGS. 8A and 8B are waveforms of a voltage and a current at a subtractive polarity winding of a magnetic flux coupling-type superconducting fault current limiter in accordance with an embodiment of the present invention.

In the conventional magnetic flux-lock type fault current limiter, the magnitude of the initial line current ($I_{ini}$) is 15.7 A at 21 turns and 8.2 A at 42 turns at an additive polarity winding. In other words, as the number of turns increases, the magnitude decreases. The magnitude of the initial line current ($I_{ini}$) is 32.01 A at 21 turns and is limited to 40.1 A at 42 turns at a subtractive polarity winding. In the magnetic flux-coupling type fault current limiter according to the present invention, the magnitudes of the initial line current ($I_{ini}$) are 5.92 A and 9.29 A at 21 turns and 42 turns, respectively at an additive polarity winding and the magnitude of the initial line current ($I_{ini}$) is 5.5 A at 21 turns and 12.05 A at 42 turns at a subtractive polarity winding. In other words, as the number of secondary turns decreases, the magnitude of the initial line current ($I_{ini}$) decreases.

It is confirmed that the line current, which is initially limited in the magnetic flux-coupling type superconducting fault current limiter, is decreased in comparison with conventional magnetic flux-lock type superconducting current limiter, as shown in the current waveforms shown of FIGS. 6A, 6B, 8A and 8B.

As compared with the quench occurrence time ($T_q$) in the magnetic flux-coupling type fault current limiter according to the present invention, 0.75 ms is reduced to 0.41 ms in 21 turns and 0.96 ms reduced to 0.58 ms in 42 turns at an additive polarity winding. For subtractive polarity winding, 1.37 ms is reduced to 0.78 ms in 21 turns, and 2.50 ms is reduced to 2.23 ms in 42 turns. That is, the quench time becomes shorter.

The magnetic flux-coupling type fault current limiter according to the present invention showed small values of an initial line current $I_{FCL}$, and a small element voltage at an additive polarity winding and a subtractive polarity winding, compared to the conventional magnetic flux-lock type superconducting fault current limiter. In addition, the quench time is shorter than that of a conventional magnetic flux-lock type fault current limiter. Therefore, it was confirmed that it is more efficient in view of reliability and stability for protecting lines.

If the primary coil and the secondary coil are in wound in series, and when a fault occurs, the voltage is distributed into the primary voltage and the secondary voltage. Furthermore, the secondary voltage has the same value as the element voltage ($V_{SC}$). As the secondary coil is increased from 21 turns to 42 turns, the element voltage ($V_{SC}$) is induced to have the similar magnitude to the primary voltage ($V_1$).

The characteristics of the present invention namely, the change of each quench characteristics in accordance with the change of turns of the secondary coil now will be described in the concrete embodiments as follows.

Figure 9A:
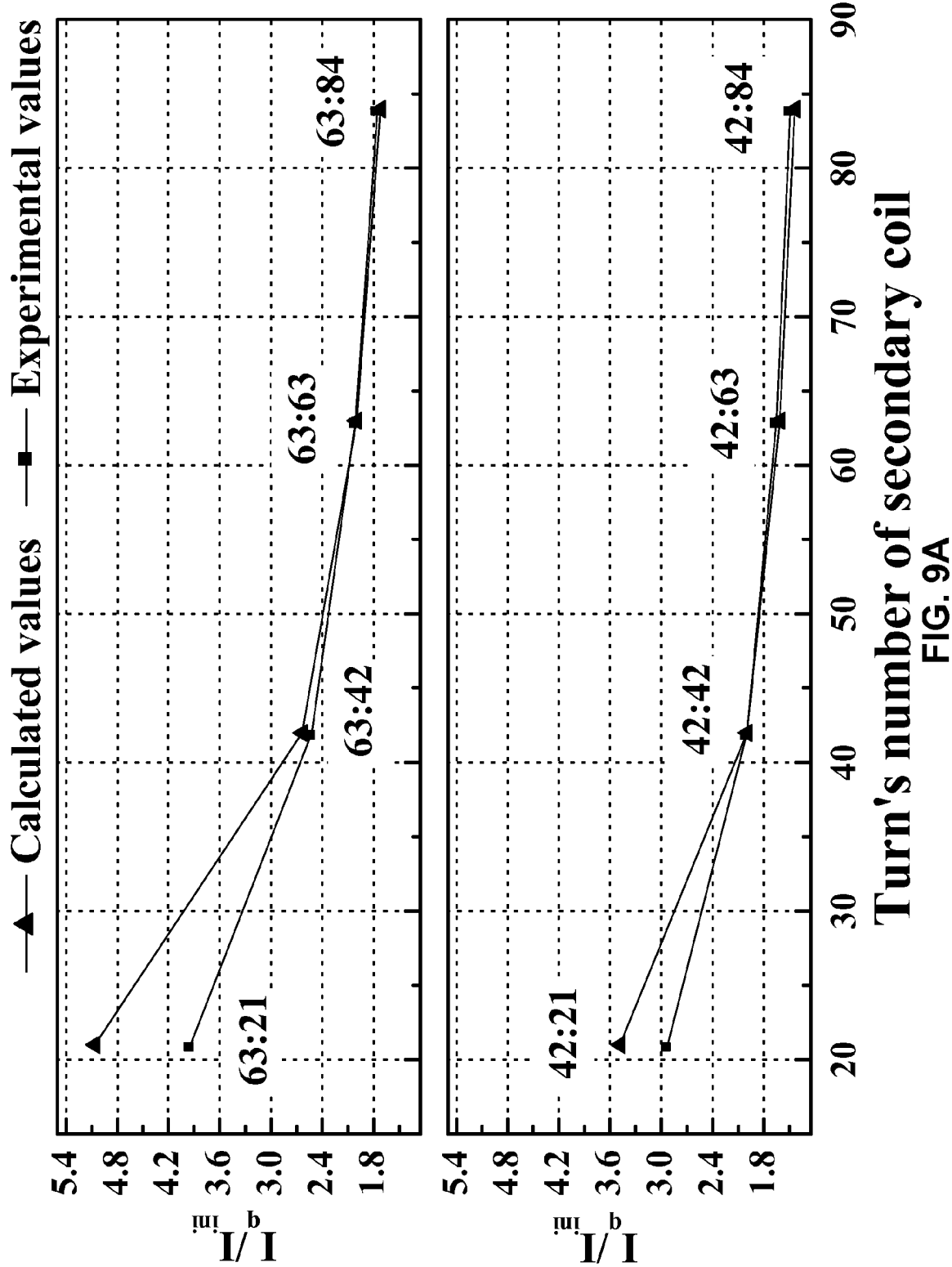
FIGS. 9A-9D are graphs showing the change of characteristics as a function of a number of turns at an additive polarity winding of a current limiter in accordance with one embodiment of the present invention.
Figure 9B:
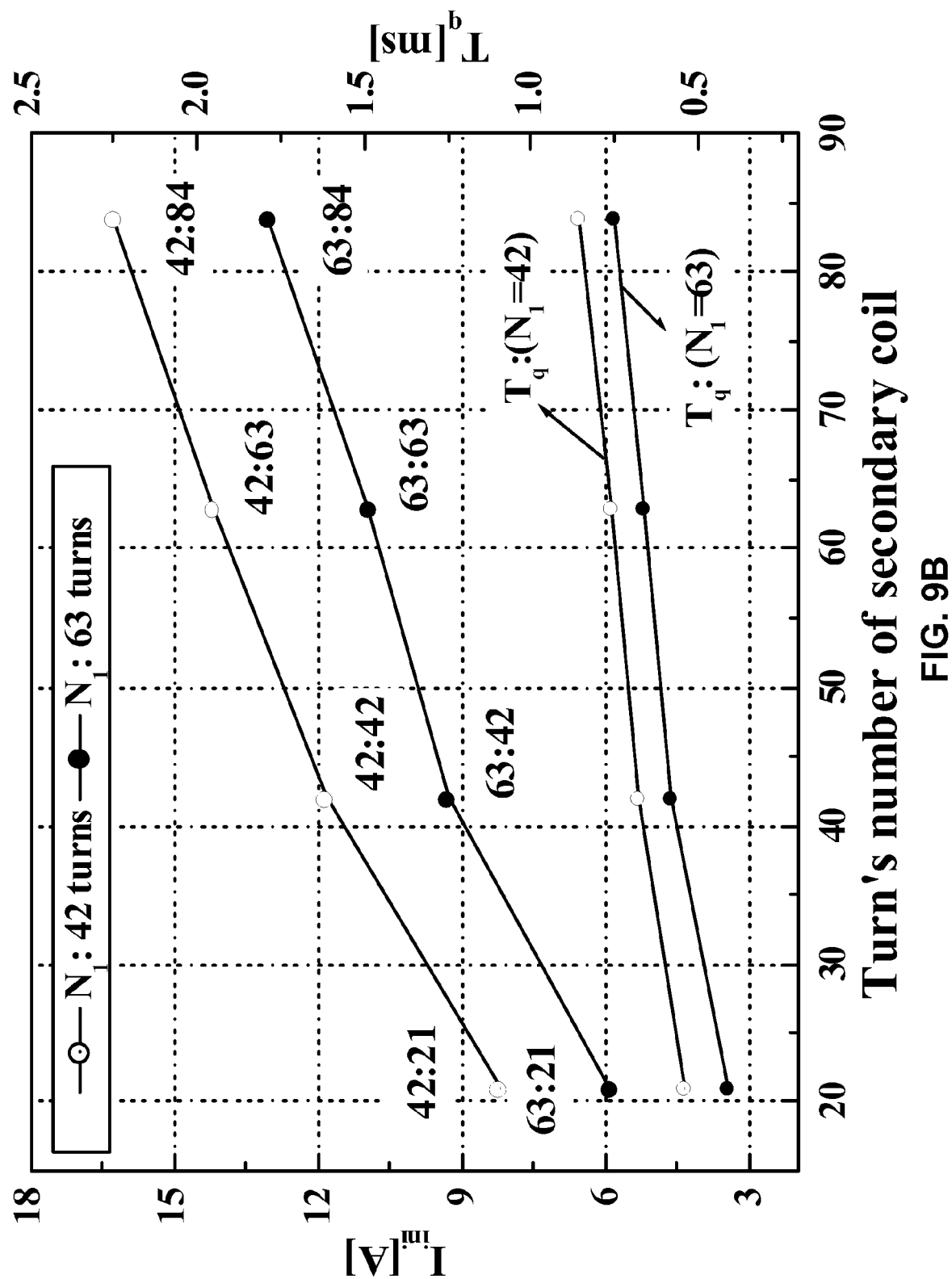

FIGS. 9A and 9B are graphs showing the change of characteristics in accordance with the change of the number of turns at an additive polarity winding of a magnetic flux-coupling type superconducting fault current limiter in accordance with one embodiment of the present invention.

Figure 9C:
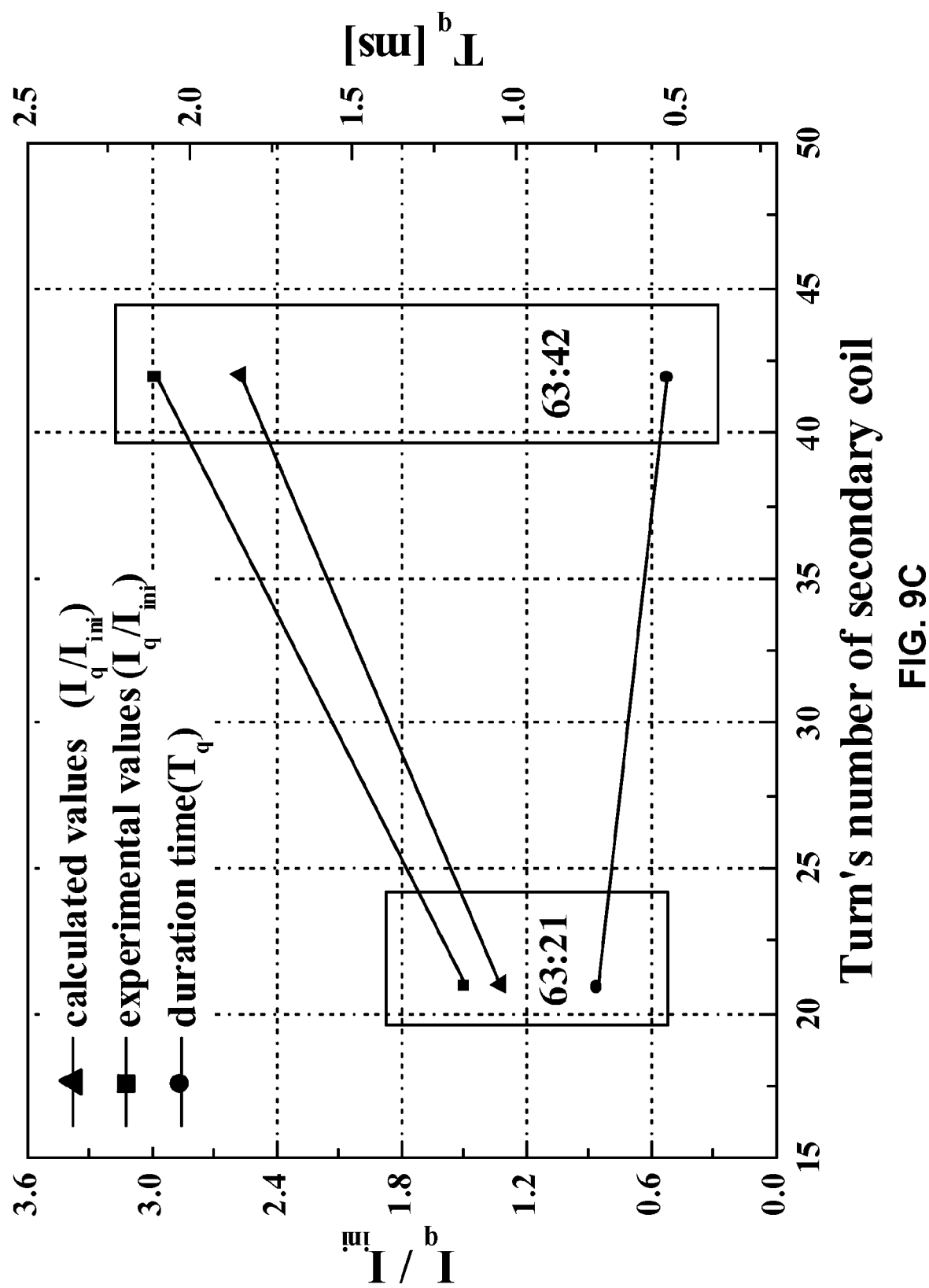
Figure 9D:
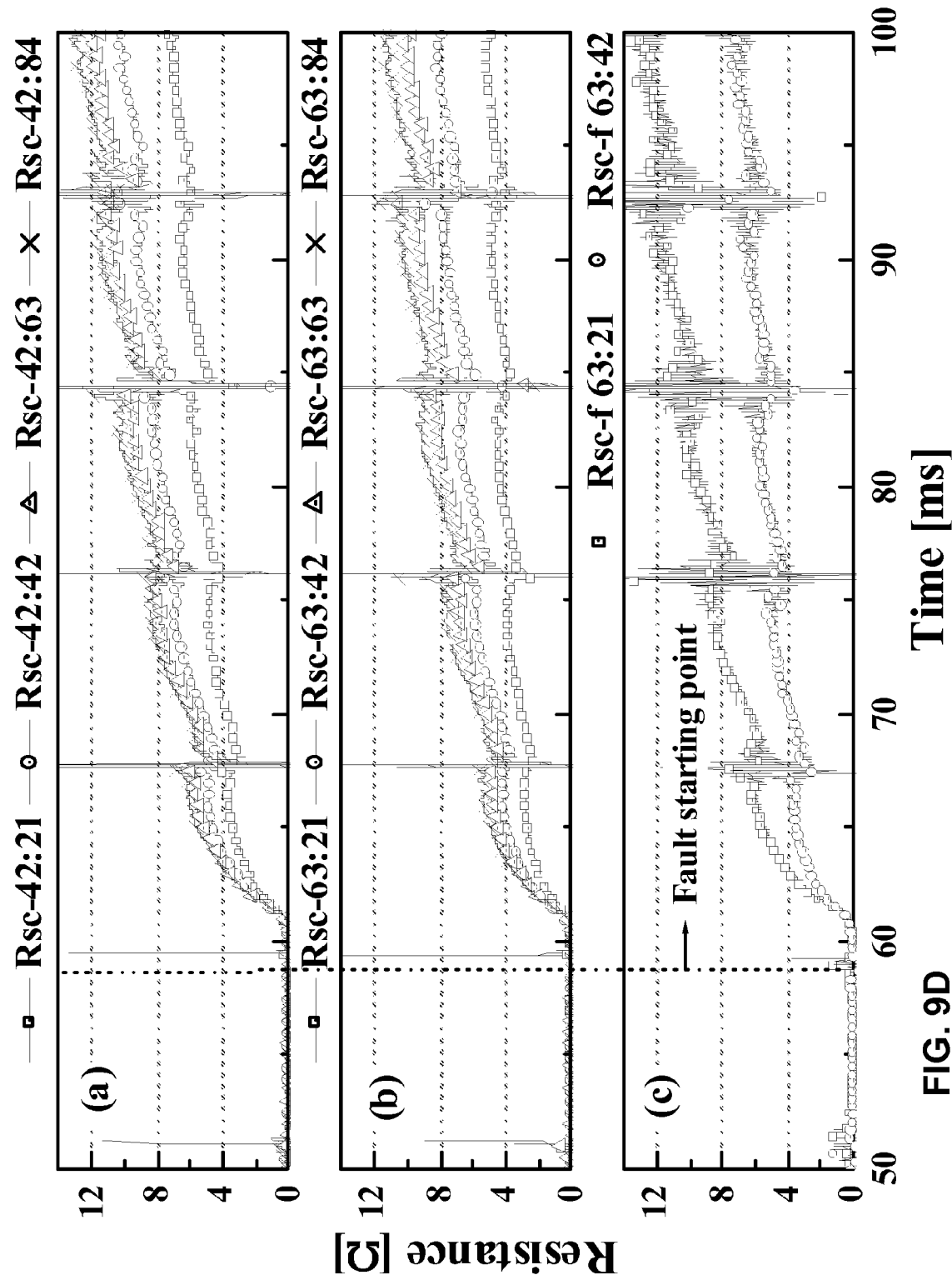

FIGS. 9C and 9D are waveforms showing the change of characteristics in accordance with the change of the number of turns at an additive polarity winding of a magnetic flux-lock type superconducting fault current limiter.

FIG. 9A is a waveform showing the ratio of a quench current to an initial current in accordance with an inductance ratio of $L_1/L_2$, the Equation 10 and the secondary coil is increased into 21, 42, 63 and 84 turns when the primary coil is fixed to 42 and 63 turns, in order to find out the operational characteristics with respect to a winding ratio. It is found out that as the number of turns increases, the current ratio is decreased in FIG. 9A. After a fault occurs, the fault current is represented in $$\left[1 - \sqrt{\frac{L_2}{L_1}}\right] \cdot I_q = I_{ini}$$

at an additive polarity winding in a magnetic flux-lock type, and $$\left[\frac{\sqrt{L_1}}{L}\right] \cdot I_{ini} = I_q$$

is true. Therefore, these two equations can be compared $L = \sqrt{L_1} + \sqrt{L_2}$.

This shows that the magnetic flux-lock type has a structure where the increase of an inductance of the primary coil increases the current flowing in Isc. If the inductance ratio is close to 1, the denominator is 0:

$$I_q = \frac{I_{ini}}{0}.$$

Therefore, the current flowing into the superconductor increases dramatically. In other words, if the inductance ratio is 1:1, the superconductor might get damaged.

FIG. 9B is a graph showing the change of an initial current and a quench time in as a function of a turns ratio.

Referring to FIG. 9B, the initial line current is differently shown even if the turns ratio is the same like 42:42 and 64:64. If the turns ratio is 42:42, the initial line current is 11.8 A and if the turns is 64:64, the initial line current is 10.9 A. The quench time (Tq) becomes short as the number of turns of the two coils increases as shown in FIG. 9B. The initial limiting current ($I_{ini}$) increases in proportion to the turns of the primary coil and the secondary coil. This means that the initial limiting current ($I_{ini}$) can be controlled by controlling the change of the turns between the two coils.

FIG. 9C is a graph showing a quench time at an additive polarity winding of a magnetic flux-lock type, an initial current and a quench current ratio in accordance with a turns ratio. Referring to FIG. 9C, it is found out that the flow of the current of the primary coil is increased by adjusting the inductance of the secondary coil. Therefore, the line current $I_{FCL}$ is decreased. The magnetic flux of the line current is generated when a fault occurs, and the quench operations when the turns ratio is 63:42 is reinforced in comparison with the those at 63:21. It is equivalent to the $I_q/I_{ini}$ test result as shown in FIG. 9C. However, if the inductance of the primary coil is the same as that of the secondary coil, the current flowing in the YBCO thin film exceeds its allowable current. This is shown in the equation, $$\left[1 - \sqrt{\frac{L_2}{L_1}}\right] \cdot I_q = I_{ini}.$$

FIG. 9D is a graph showing the change of a resistance in accordance with each turns ratio. Referring to FIG. 9D, it is found out that as the turns of the secondary coil increase, the resistance ($R_{SC}$) is increased. The above-mentioned graphs are shown in Tables 2-4 as follows:

TABLE 2

| Fixing primary 42 turns | Inductance ratio | Real current ratio (Initial) | Quench time |
|---|---|---|---|
| 42:21 | 6.177 | 3.003 | 0.53 |
| 42:42 | 1 | 2.005 | 0.68 |
| 42:63 | 0.374 | 1.653 | 0.76 |
| 42:83 | 0.193 | 1.512 | 0.85 |

TABLE 3

| Magnetic flux - coupling type (Fixing primary 63 turns) | Inductance ratio | Real current ratio (Initial) | Quench time |
|---|---|---|---|
| 63:21 | 16.518 | 3.942 | 0.41 |
| 63:42 | 2.674 | 2.498 | 0.58 |
| 63:63 | 1 | 2.007 | 0.66 |
| 63:84 | 0.515 | 1.760 | 0.75 |

TABLE 4

| Magnetic flux - lock type (Fixing primary 63 turns) | Real current ratio | Calculated current ratio |
|---|---|---|
| 63:21 | 1.4936 | 1.326 |
| 63:42 | 2.9824 | 2.574 |

As described above, the magnetic flux-coupling type superconducting current limiter according to the present invention has the effect of limiting a fault current caused by the control of an inductance and decreasing a load on an element by the serial connection between the primary coil and the secondary coil.

Furthermore, it operates during a quench time more rapidly than the conventional superconducting fault current limiter, to protect power lines more effectively by rapidly limiting a fault current.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A magnetic flux coupling-type superconducting fault current limiter comprising:
    a primary coil and a secondary coil wound around a magnetic iron core in a laminated structure, and connected in series; and
    a superconducting element connected in parallel with the secondary coil.

2. The limiter of claim 1, wherein the superconducting element is immersed in a bath of liquid nitrogen.

3. The limiter of claim 1, wherein at least one tap is located between the primary coil and the secondary coil to change a number of turns.

4. The limiter of claim 1, wherein the magnetic iron core uses a ferromagnetic iron core.

5. The limiter of claim 1, wherein the primary coil and the secondary coil are wound in an additive polarity manner and a subtractive polarity manner, respectively.

6. The limiter of claim 1, wherein the superconducting element includes a thin film of superconducting material.

7. The limiter of claim 1, wherein the superconducting material is YBCO.

8. The limiter of claim 1, wherein the superconducting element is maintained at a temperature of liquid nitrogen or lower.

9. The limiter of claim 1, wherein the superconducting element includes a thin film of YBCO.

10. The limiter of claim 1, wherein a plurality of taps are located between the primary coil and the secondary coil to change a number of turns.

* * * * *

UNITED STATES PATENT AND TRADEMARK OFFICE
CERTIFICATE OF CORRECTION

| | |
|---|---|
| PATENT NO. | : 7,679,867 B2 |
| APPLICATION NO. | : 11/693761 |
| DATED | : March 16, 2010 |
| INVENTOR(S) | : Hyo-Sang Choi |

Page 1 of 1

It is certified that error appears in the above-identified patent and that said Letters Patent is hereby corrected as shown below:

On Title Page, Item [75] in the listing of inventors, add:

Han, Byoung-Sung; and Yu, Jae-Hoe

Signed and Sealed this

Twenty-seventh Day of April, 2010

David J. Kappos
*Director of the United States Patent and Trademark Office*